(12) United States Patent
Bednarik et al.

(10) Patent No.: US 7,097,881 B2
(45) Date of Patent: Aug. 29, 2006

(54) PRINTED RELEASE LINERS

(75) Inventors: Ladislav Bednarik, Loveland, OH (US); George Orlych, Appleton, WI (US)

(73) Assignee: Mondi Packaging Akrosil, LLC, Vienna (AT)

( * ) Notice: Subject to any disclaimer, the term of this patent is extended or adjusted under 35 U.S.C. 154(b) by 8 days.

(21) Appl. No.: 10/339,306

(22) Filed: Jan. 10, 2003

(65) Prior Publication Data
US 2004/0137242 A1 Jul. 15, 2004

(51) Int. Cl.
*B05D 3/14* (2006.01)
*C09D 11/10* (2006.01)

(52) U.S. Cl. ............... 427/299; 427/314; 428/447; 428/451; 106/31.28; 106/31.6; 106/31.85; 106/31.86; 106/31.89; 106/31.9; 523/400

(58) Field of Classification Search ...... 428/32.1–32.8, 428/447
See application file for complete search history.

(56) References Cited

U.S. PATENT DOCUMENTS

| 5,691,022 | A | 11/1997 | Knauf |
| 5,830,927 | A | 11/1998 | Vanderhoff et al. |
| 6,054,208 | A | 4/2000 | Rega et al. |
| 6,140,386 | A | 10/2000 | Vanderhoff et al. |
| 6,210,767 | B1 | 4/2001 | Knauf |
| 6,299,945 | B1 | 10/2001 | Mertz et al. |
| 6,476,840 | B1 * | 11/2002 | Taylor et al. ............ 347/212 |
| 6,551,395 | B1 * | 4/2003 | Isogawa ............... 106/31.75 |

FOREIGN PATENT DOCUMENTS

| EP | 071 345 A2 * | 2/1983 |
| EP | 0 984 045 | 8/2000 |
| WO | WO 02/20276 | 3/2002 |

* cited by examiner

*Primary Examiner*—Marc S. Zimmer
(74) *Attorney, Agent, or Firm*—Michael Best & Friedrich LLP

(57) ABSTRACT

Cationic radiation curable inks do not exhibit ghosting when coated over by a solvent, solventless and radiation curable silicone release coatings. When aggressive solvent borne adhesives are cast over the ink applied to a substrate, and peeled off after drying, no ghosting is observed. The result is the ability to print graphics onto a substrate and cover the substrate with a silicone release coating and a coat with an adhesive layer that retains acceptable clarity after removal of the release coating.

6 Claims, 1 Drawing Sheet

PRINTED RELEASE LINERS

BACKGROUND OF THE INVENTION

Water borne inks are poor in adhesion and durability when applied to plastic films used in release liner manufacturing. Solvent base coatings give rise to what is known in the industry as "ghosting". Ghosting occurs when a release adhesive is cast over a silicone coating. Upon the dried adhesive removal, the printed pattern transfer to the adhesive film along with varying color intensity from the print. This action has been traced to transfer of the silicone film and part of the printing ink to the adhesive. This is not acceptable to the end users of the release liner. There is a need in the art for a printed substrate with a silicone coating that will not "ghost" when an adhesive layer is removed.

It is an object of the invention to provide an ink useable on a release coating of silicone.

It is another object of the invention to provide an ink that does not exhibit ghosting when coated over with solvent, solventless and radiation curable silicone release coatings.

It is another object of the invention to provide a print formulation used under a silicone coating that is inexpensive to manufacture and easy to administer.

These and other objects of the invention will become apparent to one of ordinary skill in the art after reviewing the disclosure of the invention.

SUMMARY OF THE INVENTION

Cationic radiation curable inks do not exhibit ghosting when coated over by a solvent, solventless and radiation curable silicone release coatings. When aggressive solvent borne adhesives are cast over the ink applied to a substrate, and peeled off after drying, no ghosting is observed. The result is the ability to print graphics onto a substrate and cover the substrate with a silicone release coating and coat with an adhesive layer that retains acceptable clarity after removal of the adhesive coating.

DETAILED DESCRIPTION OF THE INVENTION

Figure 1:
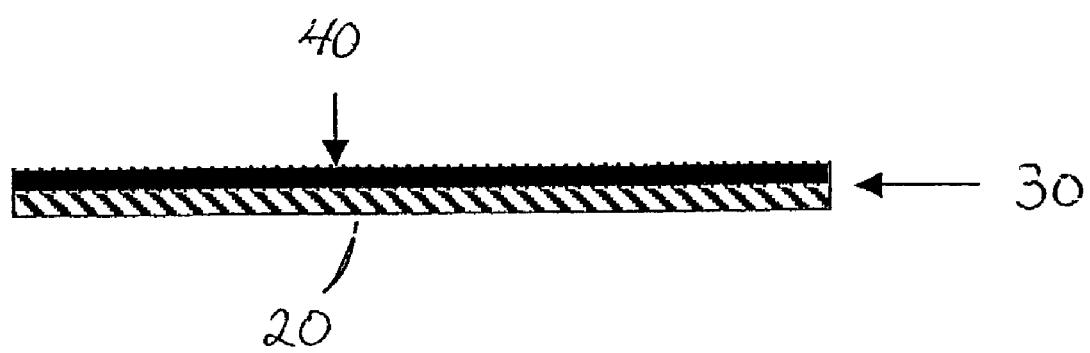
FIG. 1 is cross-section view of the laminate of the invention.

The cationic radiation curable inks are applied to a substrate 20. The substrate is then covered by a release layer such as a silicone release layer. The substrate consists of films, such as nylon, PET, and polyolefins such as polypropylene, high density, medium density, low density or linear low density polyethylene, polystyrene and blends or multi-layer combinations of these materials. The film thickness ranges from 0.5 mil to 10.0 mil. The film is typically pre-treated prior to the printing to ensure good ink adhesion. Pre-treatment methods consist of chemical process such as the application of an ink adherable coating or gas phase processes such as corona discharge treatment.

The ink is typically printed on a flexographic press and applied to the top surface 30 of the substrate using a print cylinder containing the desired print and design. An anilox roll designed to hold a certain quantity of ink transfers the ink to the print cylinder containing the designs. The anilox roll designated as 660 lines per inch and 2.0 billion cubic microns was used, but any combination could be used. The ink is cured using UV radiation after application to the substrate. The cationic radiation curable inks have the general formulation of cycloallphatic resin, bisphenol epoxy resin, polyol, photo initiator, bubble breaker, surfactant, wetting agent and pigment.

The printed substrate is silicone coated. Various types of silicone were used including UV cationic cure silicones, solventless platinum catalized addition cured silicones, and solvent based tin catalized condensation cured silicone. The silicone is coated using various methods including wire-wound rod (Mayerod), direct gravure, indirect (offset gravure) or fivril coating. The silicones can be thermally cured or UV cured depending on the system.

The laminate is then cast with adhesive. The resulting laminate does not demonstrate the problems of "ghosting" present in prior art laminates when the adhesive is removed. This results in the ability to print on the top surface of the film and retain clarity after the removal of the adhesive layer.

While the invention has been described with reference to preferred embodiments, variations and modifications would be apparent to one of ordinary skill in the art without departing from the scope of the invention. The invention covers these variations and modifications.

We claim:

1. A laminate, comprising:
    a substrate,
    an ink printed on said substrate,
    a coating placed over said printed substrate, wherein the ink comprises a cycloaliphatic resin, bisphenol epoxy resin, polyol, photoinitiator, bubble breaker, surfactant, wetting agent and pigment, and
    wherein said coating is silicone.

2. The laminate of claim 1, wherein said substrate is at least one member selected from the group consisting of nylon, PET, and a polyolefin.

3. A method for making a printed substrate, comprising:
    providing a substrate,
    printing said substrate with an ink comprising a cycloaliphatic resin, bisphenol epoxy resin, polyol, photoinitiator, bubble breaker, surfactant, wetting agent and pigment
    curing said ink, and
    applying a release coating to said printed substrate,
    wherein said coating is applied by wire-wound rod, direct granite, offset gravure of fibril coating.

4. A method for making a printed substrate, comprising:
    providing a substrate,
    printing said substrate with an ink comprising a cycloaliphatic resin, bisphenol epoxy resin, polyol, photoinitiator, bubble breaker, surfactant, wetting agent and pigment
    curing said ink, and
    applying a coating to said printed substrate,
    wherein said coating is silicone.

5. A method for making a printed substrate, comprising:

providing a substrate, printing said substrate with an ink comprising a cycloaliphatic resin, bisphenol epoxy resin, polyol, photoinitiator, bubble breaker, surfactant, wetting agent and pigment curing said ink, applying a release coating to said printed substrate, and pretreating said substrate prior to printing to enhance ink adhesion, wherein said pretreating includes application of an ink adherable coating.

6. A method for making a printed substrate, comprising:

providing a substrate, printing said substrate with an ink comprising a cycloaliphatic resin, bisphenol epoxy resin, polyol, photoinitiator, bubble breaker, surfactant, wetting agent and pigment curing said ink, applying a release coating to said printed substrate, and pretreating said substrate prior to printing to enhance ink adhesion, wherein said pretreating includes corona discharge treatment.

* * * * *